United States Patent
Murakami et al.

(10) Patent No.: US 6,660,087 B2
(45) Date of Patent: Dec. 9, 2003

(54) ADHESIVE APPLYING APPARATUS FOR HULL

(75) Inventors: Masatoshi Murakami, Hamamatsu (JP); Toshihiro Tsuchiya, Hamamatsu (JP); Kouji Shinma, Hamamatsu (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/305,578

(22) Filed: Nov. 26, 2002

(65) Prior Publication Data

US 2003/0097979 A1 May 29, 2003

(30) Foreign Application Priority Data

Nov. 29, 2001 (JP) ........................................ 2001-364503

(51) Int. Cl.[7] ................................................. B05C 5/00
(52) U.S. Cl. .................... 118/323; 427/207.1; 427/421; 156/60; 156/391; 156/579
(58) Field of Search ................................. 118/323, 305; 156/578, 391, 60, 182, 579; 427/207.1, 421

(56) References Cited

U.S. PATENT DOCUMENTS

| | | | | |
|---|---|---|---|---|
| 4,074,383 A | * | 2/1978 | Kaplan et al. | 12/145 |
| 4,295,439 A | * | 10/1981 | Kruszona | 118/317 |
| 4,564,410 A | * | 1/1986 | Clitheros et al. | 156/356 |
| 5,714,099 A | * | 2/1998 | Merser | 264/46.4 |

* cited by examiner

Primary Examiner—Richard Crispino
Assistant Examiner—Michelle A Lazor
(74) Attorney, Agent, or Firm—Rankin, Hill, Porter & Clark LLP (57) ABSTRACT

An adhesive applying apparatus is used in joining together a hull and a deck with an adhesive. The apparatus includes an adhesive applying gun for ejecting an adhesive, and a guide means attached to the gun. The guide means guides the gun in such a manner that the gun moves along an upper edge portion of the hull.

7 Claims, 11 Drawing Sheets

ADHESIVE APPLYING APPARATUS FOR HULL

FIELD OF THE INVENTION

The present invention relates to an adhesive applying apparatus for use in joining together a hull and a deck with an adhesive to thereby form a body of a boat.

BACKGROUND OF THE INVENTION

Known small-sized boats include engines and jet pumps mounted to sterns thereof. The jet pumps are driven by the engines to pump water thereinto. The water thus drawn into the jet pumps are caused to jet rearwardly to thereby thrust the boats. These boats include hulls and decks joined together.

Figure 11:
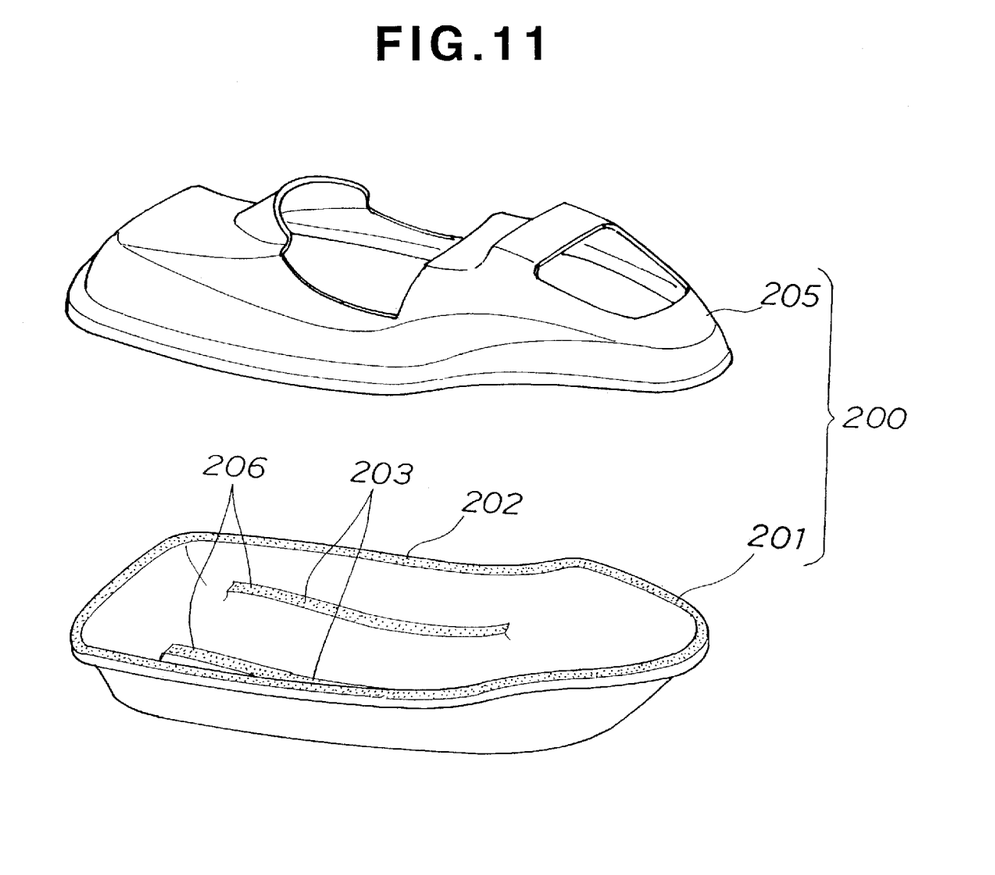
FIG. 11 is a view showing a hull and a deck to be joined together with an adhesive applied to the hull in a conventional manner.

FIG. 11 hereof illustrates one example of the above boats. A body 200 of a boat includes a deck 205 and a hull 201. The body 200 is formed using an adhesive applying gun as described hereinbelow. The gun includes a nozzle for ejecting an adhesive 206 onto an upper edge 202 and a pair of ribs 203, 203 of the hull 201. With the adhesive 206 applied to the edge 202 and the ribs 203, 203, the deck 205 adheres to the hull 201 to form the body 200.

To effect the application of the adhesive 206 to the edge 202 and the ribs 203, 203, the gun needs to move along the edge 202 and the ribs 203, 203, ejecting the adhesive 206 thereonto. This can be done in a variety of manners. A human operator may move the gun along the edge 202 and the ribs 203, 203, holding the same by hand, for example.

Because the gun is relatively heavy, however, it is difficult for the human operator to precisely move the gun along the ribs 203, 203 and especially any curved portion of the edge 202 with the nozzle directed towards the same. This leads to increased burden imposed on the operator.

SUMMARY OF THE INVENTION

An object of the present invention is to provide an adhesive applying apparatus designed to apply an adhesive to an upper edge portion of a hull, moving therealong in such a manner as to provide a reduced burden imposed on the operator.

According to one aspect of the present invention, there is provided an adhesive applying apparatus for use in joining a hull and a deck together with an adhesive, the hull having a hull body and an upper edge portion formed integrally with the hull body, the adhesive applying apparatus comprising: an adhesive applying gun for ejecting the adhesive; and a guide device mounted to the adhesive applying gun for guiding the adhesive applying gun such that the adhesive applying gun moves along the upper edge portion to apply the adhesive to the upper edge portion.

Since the guide device guides the adhesive applying gun such that the gun moves along the upper edge portion of the hull, an operator can easily move the gun along the upper edge portion of the hull. Thus, the operator can readily perform an operation of applying the adhesive to the upper edge portion of the hull. This results in a reduced burden imposed on the operator.

Because the guide device guides the gun along the upper edge portion of the hull, the gun can be precisely moved along the upper edge portion of the hull. It thus becomes possible to accurately apply the adhesive to the upper edge portion of the hull.

In a preferred form of the present invention, the upper edge portion of the hull has a horizontal portion extending outwardly from an upper end of the hull body and a side flange extending downwardly from an outer end of the horizontal portion, and wherein the guide device comprises plural rollers disposed on opposite sides of the side flange to sandwich the side flange. In a further preferred form of the present invention, the plural rollers comprise a pair of outer rollers disposed outside the side flange and juxtaposed in parallel to the upper edge portion, and an inner roller disposed inside the side flange.

The rollers are disposed on the opposite sides of the side flange to sandwich the side flange. It becomes possible to ensure that the gun precisely moves along the upper edge portion of the hull.

In a further preferred form of the present invention, the guide device further comprises a height positioning member disposed to abut on a back surface of the horizontal portion to keep a distance between the upper edge portion and the adhesive applying gun to a constant.

The height positioning member is arranged to abut against the back surface of the horizontal portion to thereby maintain the gun a fixed distance above the horizontal portion.

The adhesive applying gun can be moved along the horizontal portion in addition to being spaced from the horizontal portion by the fixed distance, and hence the operator can perform the operation of applying the adhesive to any desired location of the horizontal portion with accuracy.

BRIEF DESCRIPTION OF THE DRAWINGS

A certain preferred embodiment of the present invention will hereinafter be described in detail, by way of example only, with reference to the accompanying drawings, in which:

FIG. 8A is a view analogous to FIG. 5 with the support plate held in a pivoted position while

DETAILED DESCRIPTION OF THE PREFERRED EMBODIMENTS

Figure 1:
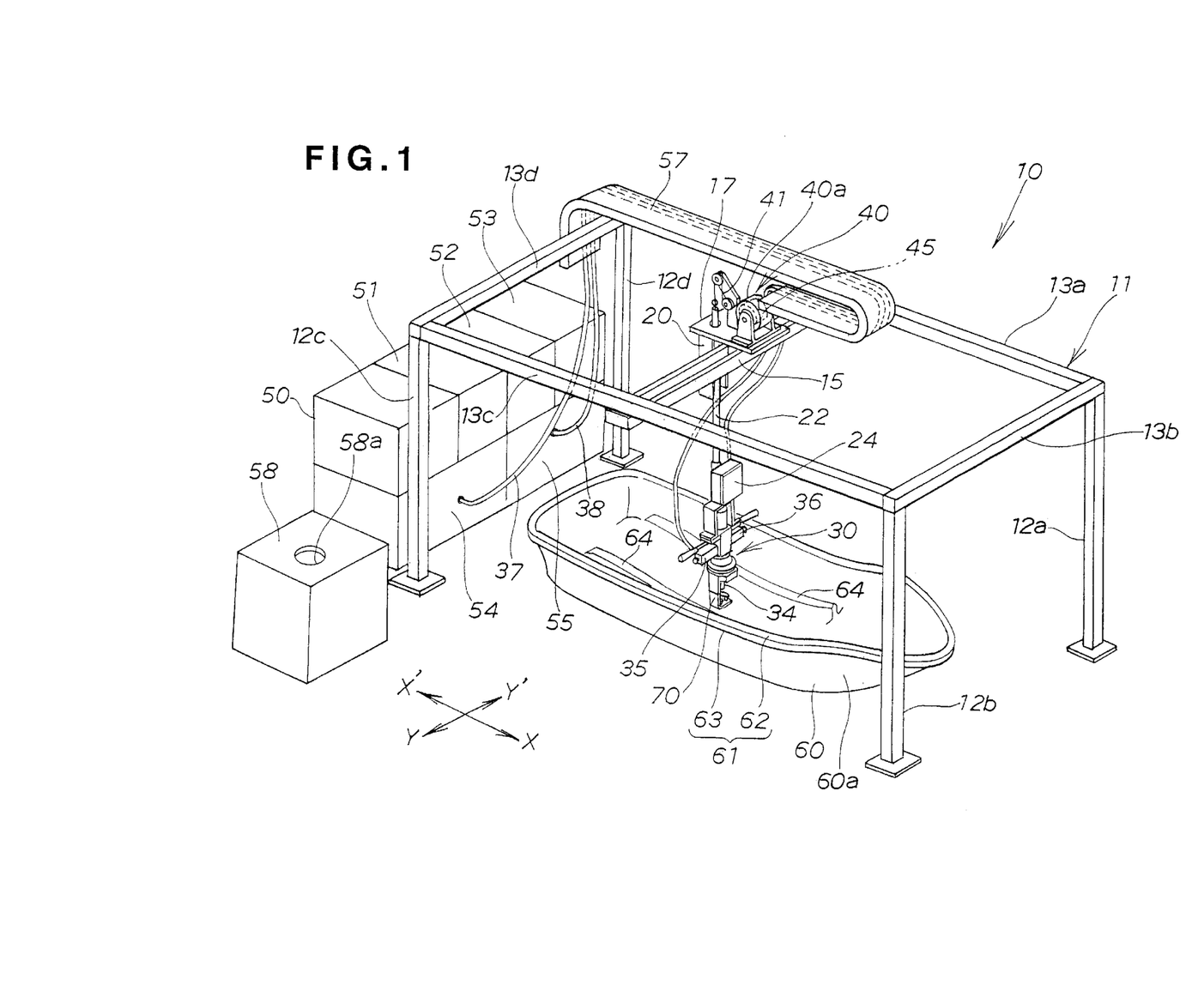
FIG. 1 is a perspective view of an adhesive applying apparatus for a hull according to the present invention.

Referring to FIG. 1, an adhesive applying apparatus for a hull 60 is shown generally at 10. The apparatus 10 includes four supporting posts 12a to 12d and four top beams 13a to 13d. The posts 12a, 12b support the top beam 13b while the posts 12c, 12d support the top beam 13d. The top beams 13b, 13d have the top beams 13a, 13c extending therebetween. The apparatus 10 includes a beam 15 movable along the top beams 13a, 13c, and a carriage 17 movable along the beam 15. In other words, the beam 15 is movable in directions X, X' while the carriage 17 is movable in directions Y, Y'. The movable beam 15 extends in a direction transverse to the top beams 13a, 13c. The carriage 17 has a guide member 20 mounted thereto. The guide member 20 has a vertically movable rod 22 provided thereat. The rod 22 has a switch box 24 and an adhesive applying gun 30 provided adjacent a lower end 22b (see FIG. 2) thereof. Carried on the carriage 17 is a hanging member 40 for hanging the rod 22. The hanging member 40 includes a counterbalance means 45 for balancing weights of the rod 22, the switch box 24, and the gun 30.

Proximate the post 12c, 12d and the top beam 13d supported on the posts 12c, 12d, there are provided four tanks 50 to 53 in alignment with each other. The tank 50 holds therein an adhesive. The tank 51 holds therein a reserve of an adhesive. Likewise, the tank 52 holds a hardener therein. The tank 53 contains therein a reserve of a hardener. The tank 50 has an adhesive supply pump 54 provided therebelow while the tank 52 has a hardener supply pump 55 provided therebelow. The pump 54 serves to pump the adhesive contained in the tank 50 into an adhesive supply hose 37. Similarly, the pump 55 serves to pump the hardener in the tank 52 into a hardener supply hose 38. The hose 37 communicates with a valve 35 for the adhesive. The hose 38 communicates with a valve 36 for the hardener.

The hull 60 has a hull body 60a and an upper edge portion 61 formed integrally with the hull body 60a. The hull body 60a has a pair of rib portions 64, 64 formed thereon. The gun 30 of the apparatus 10 has a nozzle 34. The gun 30 moves along the upper edge portion 61 and the pair of rib portions 64, 64 while the nozzle 34 ejects an adhesive thereto, as will be described later, such that the adhesive can be applied to the upper edge portion 61 and the pair of rib portions 64, 64.

The apparatus 10 is simpler in construction than a robot, for example. Thus, the apparatus 10 is less costly to produce.

A cable guard member 57 has the hoses 37, 38 extending therethrough for the purpose of protection. The guard member 57 protects a harness (not shown) connected to the switch box 24 and the gun 30.

A reference numeral 58 denotes a cleaning tank for use in cleaning the gun 30, as will be explained later with respect to FIG. 10.

Figure 2:
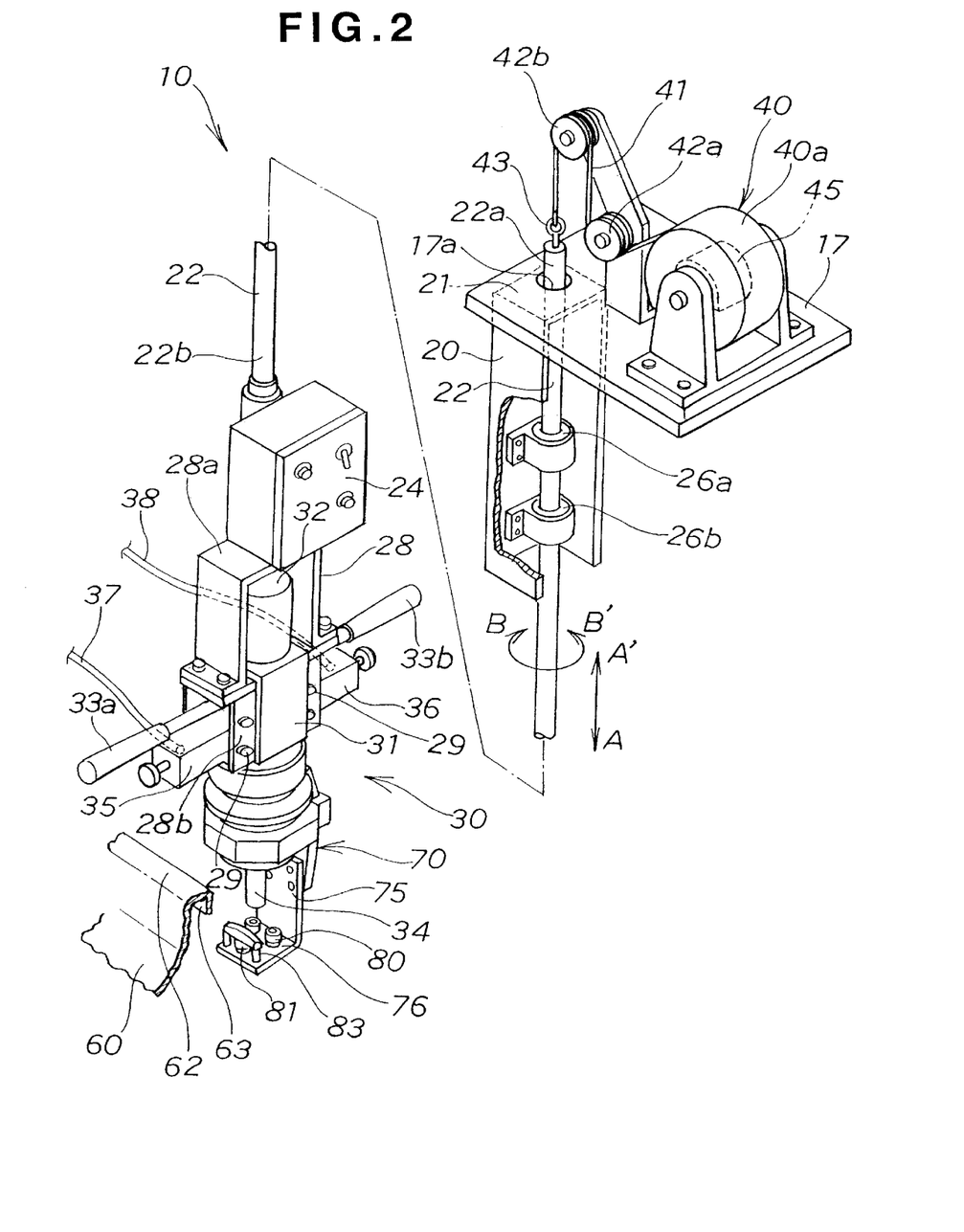
FIG. 2 is a perspective view of an adhesive applying gun and a guide means of the apparatus of FIG. 1.

Reference is made to FIG. 2. The hanging member 40 carried on the carriage 17 has a wire 41 running over first and second guide rollers 42a, 42b. The wire 41 has its one end connected via an eye bolt 43 to an upper end 22a of the rod 22.

The rod 22 extends through a guide member 20 of U-shaped cross section. The upper end 22a of the rod 22 extends out of an aperture 17a formed in the carriage 17 and an aperture (not shown) formed in a top sheet 21 of the guide member 20. The guide member 20 has upper and lower bearings 26a, 26b attached thereto. The rod 22 is vertically movably, rotationally supported by the bearings 26a, 26b.

The rod 22 is vertically movable in directions A, A' in addition to being rotatable in directions B, B'.

For a better understanding, the upper end 22a is shown projecting out of the apertures of the top sheet 21 and the carriage 17, however, it is to be understood that the wire 41 can be pulled downwardly through the apertures of the carriage 17 and the top sheet 21 into the guide member 20 for connection to the upper end 22a positioned within the guide member 20.

The rod 22 has the switch box 24 and a hold member 28 provided near the lower end 22b thereof.

The switch box 24 is provided with switches for operating the gun 30 and the pumps 54, 55 (see FIG. 1).

The hold member 28 is generally U-shaped in cross-section. The hold member 28 has its upper end 28a attached to the lower end 22b of the rod 22. A lower end 28b of the member 28 is attachable through bolts 29 to the gun 30.

The gun 30 includes a body 31 having a mixer (not shown) incorporated therein. Positioned on an upper end of the body 31 is a drive motor 32 for rotating the mixer. The hold member 28 has right and left grips 33a, 33b extending outwardly from right and left sides thereof, respectively. More specifically, the grips 33a, 33b horizontally extend in opposite directions in coaxial relation to each other. Below the grips 33a, 33b, there are located the valve 35 for the adhesive and the valve 36 for the hardener. The valve 35 is connected to the adhesive supply hose 37 whilst the valve 36 is connected to the hardener supply hose 38. At a lower end of the body 31, there is provided a guide means (a guide device) 70 as will be described in relation to FIG. 3 to FIG. 5.

Figure 7:
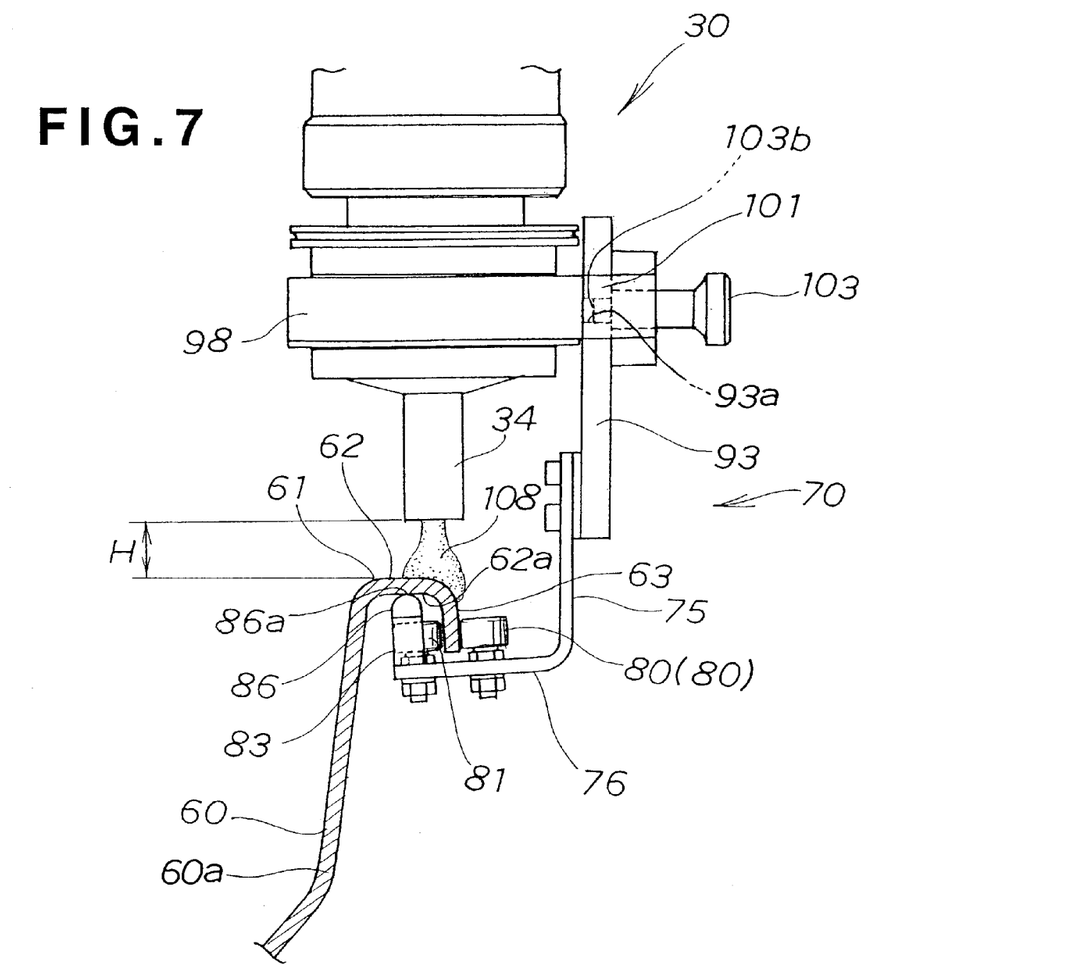
FIG. 7 is a view illustrating the gun ejecting an adhesive to the upper edge portion of the hull.

The adhesive pumped by the pump 54 is supplied through the hose 37 to the valve 35 while the hardener pumped by the pump 55 is supplied through the hose 38 to the valve 36. When the drive motor 32 drives the mixer, the mixer is caused to rotate to mix the adhesive and the hardener. The mixture of the adhesive and the hardener (hereinafter referred to as "mixed adhesive 108") is to be ejected from the nozzle 34, as shown in FIG. 7.

Figure 4:
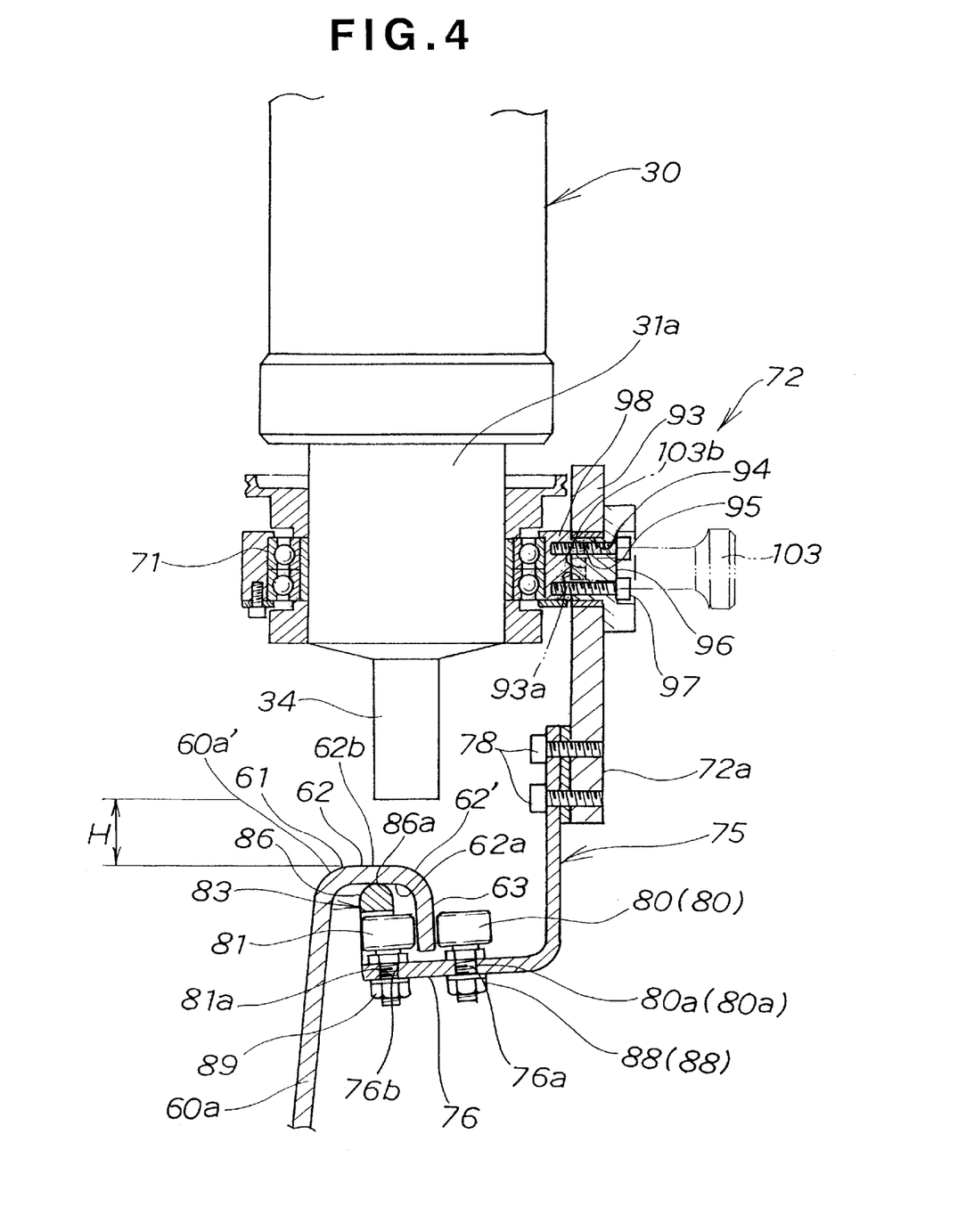
FIG. 4 is a view showing in cross-section the guide means attached to the gun.

The thus ejected mixed adhesive is to be applied to a horizontal portion 62 and a downward extension portion 63 (a side flange) of the upper edge portion 61 of the hull 60. As best shown in FIG. 4, the horizontal portion 62 of the upper edge portion 61 extends outwardly from an upper end 60a' of the hull body 60a. The downward extension portion 63 of the upper edge portion 61 extends downwardly from an outer end 62' of the horizontal portion 62.

The hanging member 40 has a body 40a. The wire 41 can be wound on the body 40a, or unwound.

The body 40a has the counterbalance means 45 built therein. The counterbalance means 45 is designed to pull up the wire 41 with a force against a downward force due to the sum of weights of the rod 22, the switch box 24, and the gun 30. Although the counterbalance means 45 is a coil spring in the illustrated embodiment, it may be a pneumatic cylinder, for example.

When the wire 41 winds on the body 40a, the gun 30 is lifted up. Thus, the wire 41 is no longer made loose. When the gun 30 is pulled downwardly against a force exerted on the gun 30 by the counterbalance means 45, on the other hand, the wire 41 is unwound. This makes it possible to keep a tension of preferred magnitude in the wire 41.

It will be noted that the counterbalance means 45 may be of type corresponding to the hanging member 40.

Provision of the counterbalance means 45 balances the weights of the rod 22, the switch box 24, and the gun 30. An operator moves up and down the gun 30 and the switch box 24 along with the rod 22, grasping the grips 33a, 33b. That is, they can move in the directions A, A'.

The rod 22 is rotationally supported by the guide member 20. When the grips 33a, 33b are turned, the gun 30 and the switch box 24 are caused to rotate together with the rod 22. Namely, they can turn in the directions B, B'.

With this arrangement, the switch box 24 and the gun 30 can be positioned in place.

The gun 30 is moved by operator's hand, and thus it can be applicable to a wide variety of other types of boats.

Figure 3:
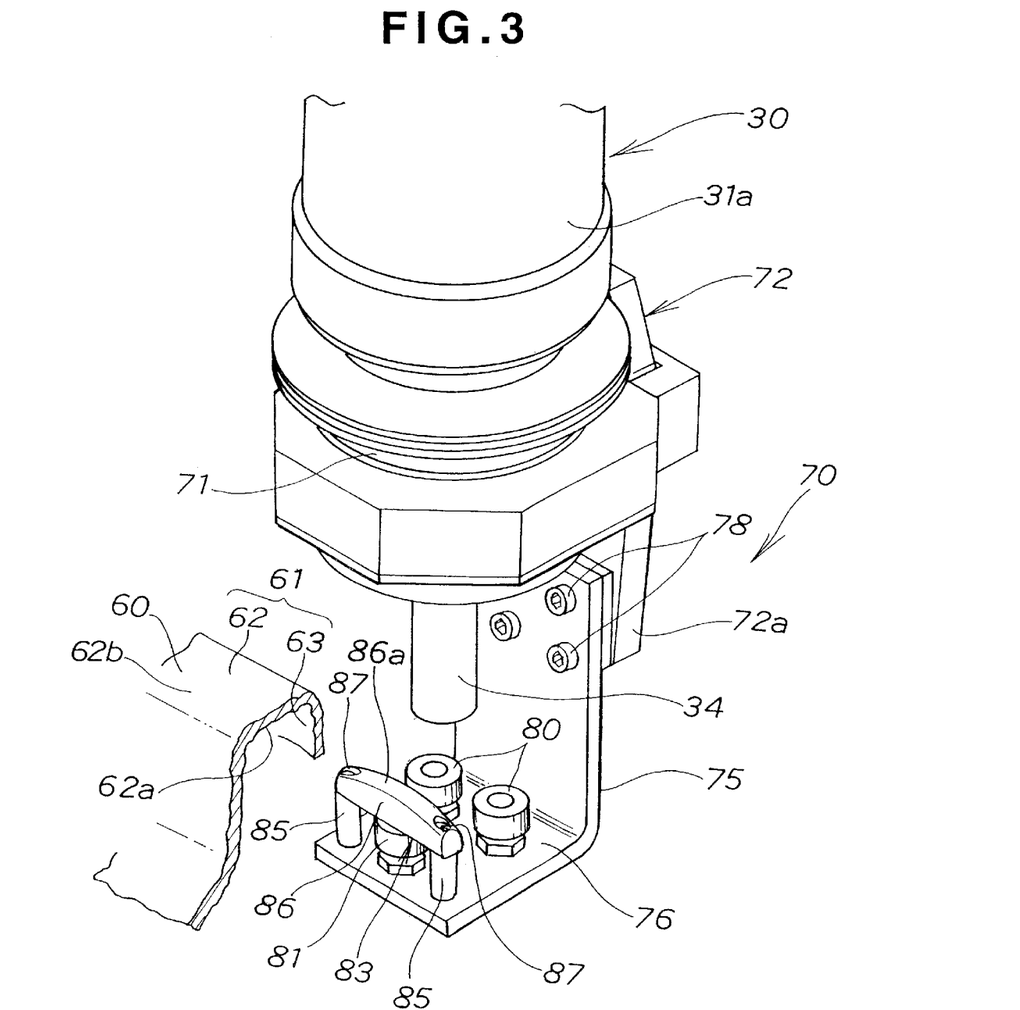
FIG. 3 is an enlarged perspective view of the gun and the guide means.

Turning to FIG. 3, the guide means 70 includes a support part 72 and a generally L-shaped bracket 75 attached through bolts 78 to a lower end 72a of the support part 72. The support part 72 is rotatably mounted via a bearing 71 to a lower end 31a of the gun 30. The bracket 75 includes a lower horizontal portion 76 having rotatable outer rollers 80, 80 and a rotatable inner roller 81 provided thereon. When in use with the upper edge portion 61, these rollers are disposed on opposite sides of the downward extension portion 63 to sandwich the portion 63. More specifically, the pair of rollers 80, 80 is positioned outside the downward extension portion 63 of the upper edge portion 61 while the roller 81 is positioned inside the portion 63, as best shown in FIG. 4. The rollers 80, 80, when positioned outside the portion 63 as shown in FIG. 4, are juxtaposed in parallel to the upper edge portion 61. The bracket 75 includes a height positioning member 83 provided on the lower horizontal portion 76. The height positioning member 83 is disposed to abut on an inner surface (a back surface) 62a of the horizontal portion 62, as best shown in FIG. 4.

The member 83 includes a pair of bosses 85, 85 positioned on opposite sides of the roller 81, and a generally inverted-hull-shaped abutment member 86 fixed to tops of the bosses 85, 85 by means of bolts 87, 87. The abutment member 86 extends over the inner roller 81.

The abutment member 86 has its upper surface 86a extending longitudinally thereof. The surface 86a is curved along the entire length of the abutment member 86. The surface 86 provides an arc-shaped configuration as taken along a plane perpendicular to the length of the abutment member 86.

Because the surface 86a is curved, the abutment member 86 can move smoothly with the surface 86a abutting on the inner surface 62a.

Referring to FIG. 4, the support part 72 is shown as being mounted via the bearing 71 to the lower end 31a of the gun 30.

This enables the support part 72 to turn on the lower end 31a.

The pair of outer rollers 80, 80 have support shafts 80a, 80a projecting out through apertures 76a, 76a formed in the lower horizontal portion 76. Nuts 89, 89 are tightened onto the shafts 80a, 80a in such a manner that the outer rollers 80, 80 are rotatably mounted to the lower horizontal portion 76. Likewise, the inner roller 81 has a support shaft 81a projecting out through an aperture 76b formed in the lower horizontal portion 76. A nut 89 is tightened onto the shaft 81a in such a manner that the inner roller 81 is rotatably mounted to the lower horizontal portion 76. The downward extension portion 63 is sandwiched between the pair of outer rollers 80, 80 and the inner roller 81 with the upper surface 86a abutting against the inner surface 62a.

With the portion 63 sandwiched between the pair of the outer rollers 80, 80 and the inner roller 81, the nozzle 34 is movable along the length of the downward extension portion 63.

Because the upper surface 86a abuts on the inner surface 62a, the nozzle 34 is maintained a fixed distance H above an outer surface 62b of the horizontal portion 62.

At a fixed level or height, the nozzle 34 is movable over the outer surface 62b of the horizontal portion 62. Thus, the adhesive ejected from the nozzle 34 can be precisely applied to desired portions of the upper edge portion 61.

The support part 72 of the guide means 70 is rotatable on the lower end 31a of the gun 30.

with the downwardly directed portion 63 sandwiched between the pair of outer rollers 80, 80 and the inner roller 81 and with the height positioning member 83 abutting on the inner surface 62a, the guide means 70 guides the gun 30 along the entire length of the upper edge portion 61, turning on the lower end 31a when necessary.

Since the guide means 70 guides the gun 30 such that the gun 30 moves along the upper edge portion 61 as stated above, the operator can readily move the gun 30 along the upper edge portion 61. Therefore, the adhesive is easily applied to the upper edge portion 61. Consequently, the operator can perform an operation of applying the adhesive with a reduced burden imposed thereon.

Figure 5:
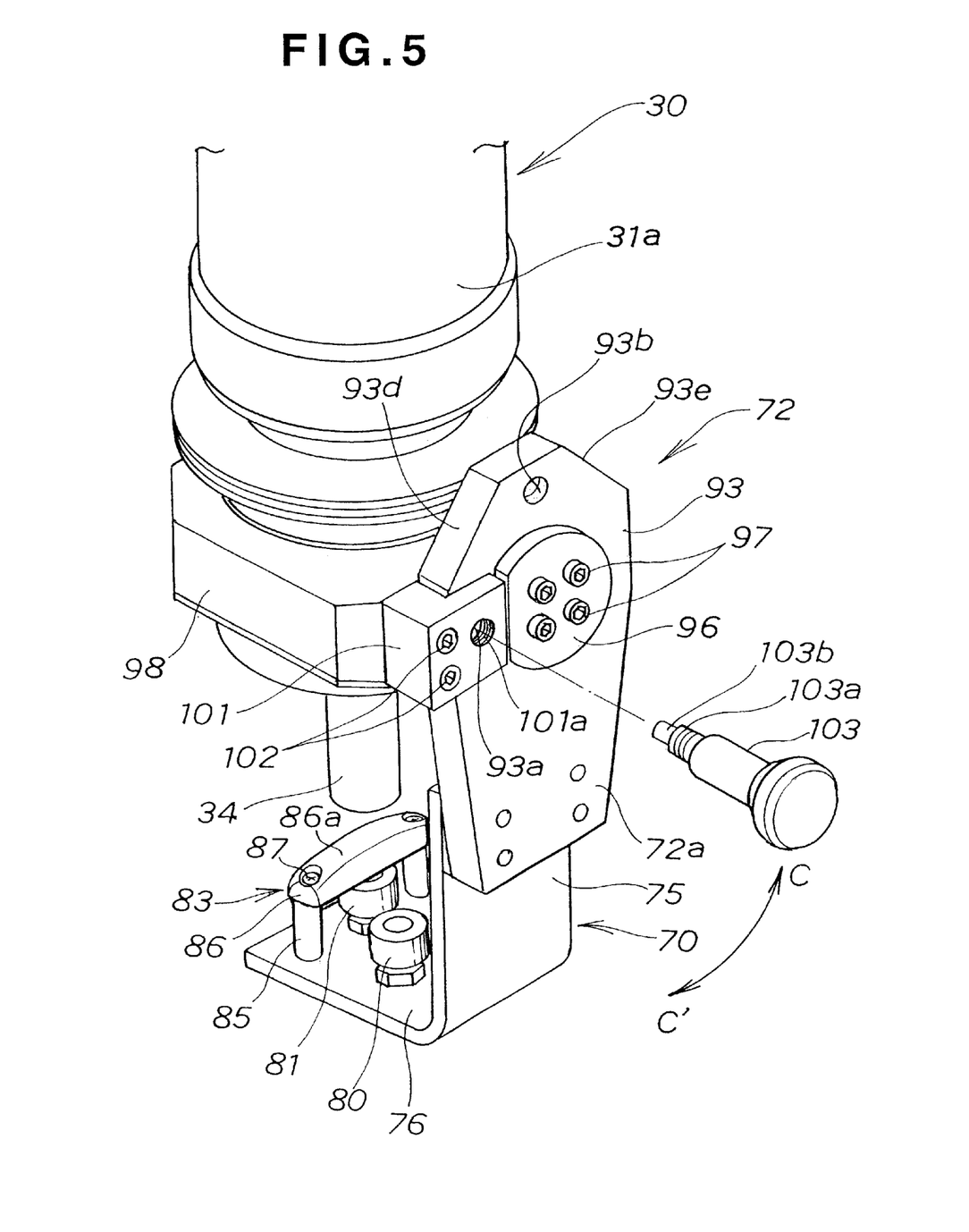
FIG. 5 is a view showing a support plate of the guide means held in a downward oriented position.

Turning to FIG. 5, the support part 72 has a support plate 93 of generally rectangular configuration. A support shaft 96 and a bush 95 enclosing therein the support shaft 96 are inserted into a mounting aperture 94 formed in the support plate 93, as shown in FIG. 4. The support part 72 includes a ring portion 98 having the support shaft 96 mounted thereto by means of bolts 97. The ring portion 98 is rotatably mounted to the lower end 31a of the gun 30 with the bearing 71 interposed therebetween.

The support plate 93 is mounted to the support shaft 96 with the bush 95 interposed therebetween. The support plate 93 is rotatable or pivotable on the support shaft 96 in directions C, C'.

The ring portion 98 has a lock member 101 secured thereto through bolts 102. The lock member 101 has a thread aperture 101a formed therein. The support plate 93 has a first lock aperture 93a formed therein. The aperture 101a is coaxial with the aperture 93a. Threaded into the aperture 101a is a threaded portion 103a of a lock bolt 103.

Further threading of the lock bolt 103 into the aperture 101a inserts a leading end 103b of the lock bolt 103 into the aperture 93a.

The support plate 93 of the support part 72 can thus be locked in a downward oriented position with the lower end 72a positioned at a lowermost level. At the same time, the guide means 70 is locked at an application position with the height positioning member 83 located below the nozzle 34.

Figure 8A:
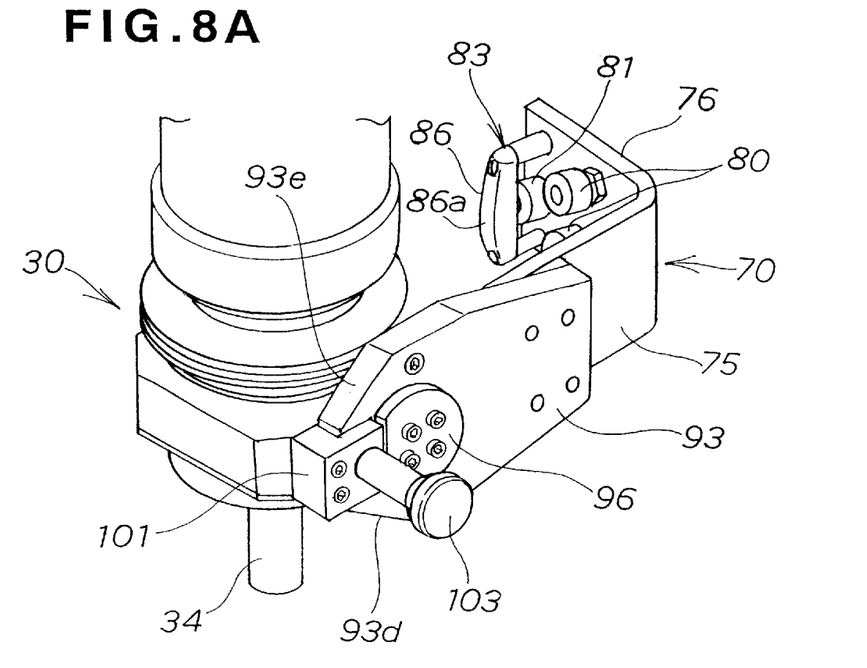

When the lock bolt 103 is loosened to withdraw the leading end 103b from the aperture 93a, the support plate 93 becomes free to pivot on the support shaft 96. The support plate 93 can pivot counterclockwise through 90 degrees to thereby turn the guide means 70 away from below the nozzle 34, as shown in FIG. 8A.

With the support plate 93 thus turned 90 degrees, a second lock aperture 93b formed in the support plate 93 is coaxial with the aperture 101a. The lock bolt 103 is threaded into the aperture 101a to thereby insert the leading end 103b into the second lock aperture 93b, such that the support plate 93 is thus locked in a position turned 90 degrees counterclockwise from the downward oriented position of FIG. 5, to thereby lock the height positioning member 83 spaced 90 degrees away from the nozzle 34, as shown in FIG. 8A.

The support plate 93 is tapered in width towards an upper end thereof to provide surfaces 93b, 93d. Providing these surfaces 93b, 93d allows the support plate 93 to turn on the support shaft 96 without the upper end of the support plate 93 interfering with the lock member 101.

Description will be made as to how the adhesive is applied to the hull 60 in accordance with the present invention.

Figure 6:
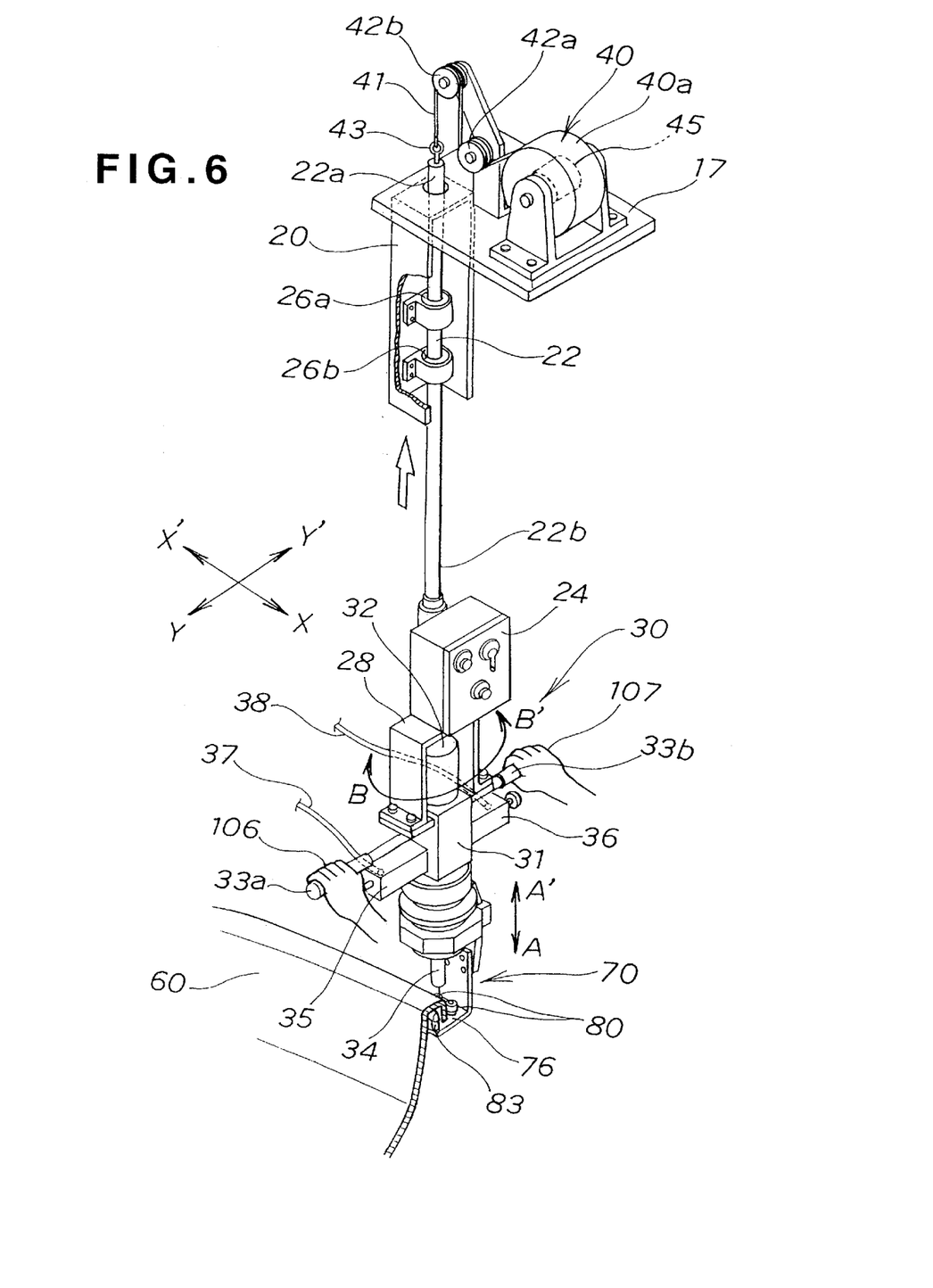
FIG. 6 is a view showing the gun manipulated by an operator with the guide means engaged with an upper edge portion of the hull.

Turning to FIG. 6, the operator moves the gun 30 and the carriage 17 in the directions indicated at X, X', Y, Y', grasping the grips 33a, 33b by his right and left hands 106, 107. The operator can also move the gun 30 in the directions A, A' and turn the same in the directions B, B', as stated above.

The body 40a of the hanging member 40 is provided with the counterbalance means 45. The counterbalance means 45 balances the weights of the rod 22, the switch box 24, and the gun 30. Thus, along with the rod 22, the gun 30 and the switch box 24 can move up and down and rotate in the directions B, B'.

This arrangement makes it possible to position the gun 30 at any desired location.

Reference is made to FIG. 7. Along with the carriage 17, the adhesive applying gun 30 is moved in the directions X, X', Y, Y', A, A', and turned in the directions B, B' to sandwich the downward extension portion 63 between the pair of outer rollers 80, 80 and the inner roller 81. This causes the surface 86a of the abutment member 86 to abut on the inner surface 62a of the horizontal portion 62.

With the downward extension portion 63 sandwiched between the pair of outer rollers 80, 80 and the inner roller 81, the nozzle 34 is movable along the portion 63. Namely, the nozzle 34 is movable over the horizontal portion 62.

Because the surface 86a abuts on the inner surface 62a during the movement of the nozzle 34 along the upper edge portion 61, the distance between the nozzle 34 and the horizontal portion 62 is kept to a constant H.

With the gun 30 positioned in place in the above manner, the switches of the switch box 24 are operated to supply the adhesive to the valve 35 through the hose 37 while supplying the hardener to the valve 36 through the hose 38.

The adhesive and the hardener thus supplied are mixed together by the mixer into the mixed adhesive 108. The mixed adhesive 108 is then ejected from the nozzle 34 towards the upper edge portion 61.

The mixed adhesive 108 can be applied to desired parts of the horizontal portion 62 and the downward extension portion 63.

Referring to FIG. 8A, the lock bolt 103 is loosened to withdraw the leading end 103b from the first lock aperture 93a. In this position, the support plate 93 is pivoted counterclockwise on the support shaft 96 through 90 degrees to thereby turn the guide means 70 away from the nozzle 34.

At this time, the second lock aperture 93b of the support plate 93 is in coaxial relation to the aperture 101a. The lock bolt 103 is threaded into the aperture 101a. Then, the lock bolt 103 is further threaded into the aperture 101a to thereby insert the leading end 103b into the second lock aperture 93b.

The insertion of the leading end 103b into the second lock aperture 93b locks the support plate 93 in a position spaced 90 degrees away from the downward oriented position. In other words, the guide means 70 is locked in a position pivoted 90 degrees away from below the nozzle 34.

Figure 8B:
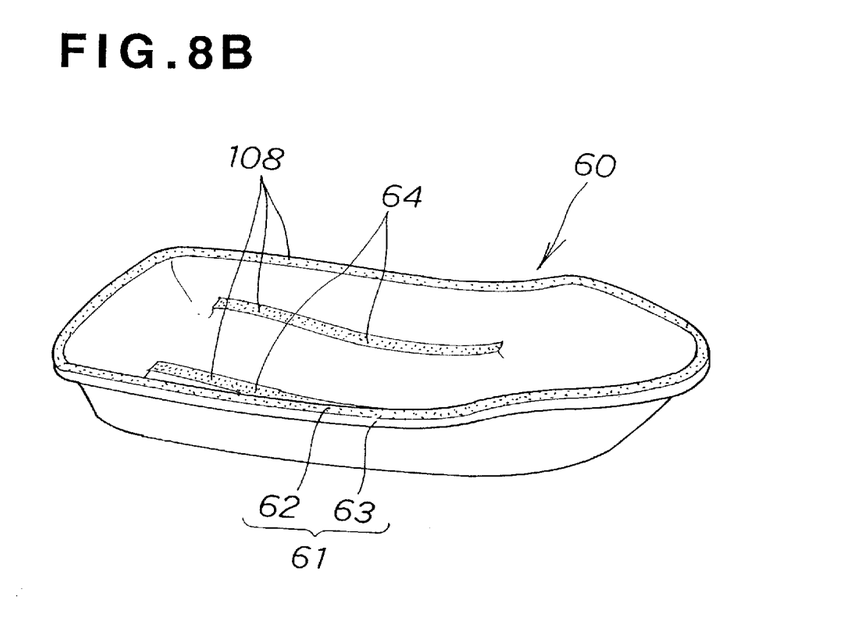
FIG. 8B shows the hull having the adhesive applied thereto.

With the guide means 70 positioned away from below the nozzle 34, as shown in FIG. 8A, the gun 30 is operated to apply the mixed adhesive 108 to the pair of the rib portions 64, 64 to thereby provide the hull 60 as shown in FIG. 8B.

During the application of the mixed adhesive 108 to the rib portions 64, 64, the guide means 70 is maintained in a spaced relation to the nozzle 34. It is therefore unlikely that the guide means 70 hinders the application of the mixed adhesive 108 even if the nozzle 34 comes closer to the rib portions 64, 64.

Figure 9:
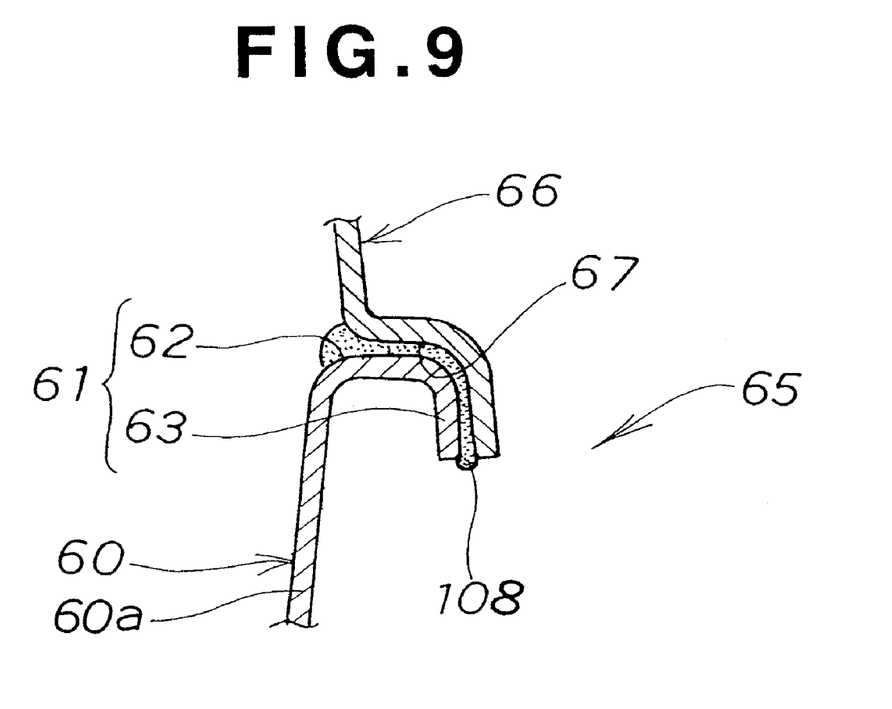
FIG. 9 is a fragmentary cross-sectional view showing portions of the hull and a deck joined together with the adhesive interposed therebetween.

As shown in FIG. 9, the deck 66 is brought onto the hull 60 after the mixed adhesive 108 is applied to the upper edge portion 61 and the rib portions 64, 64, so as to join the hull 60 and the deck 66 together. Thus, there can be made a body 65 of a small-sized boat having the hull 60 and the deck 66 adhered to the hull 60.

The deck 66 has its lower edge portion 67 jointed to the upper edge portion 61 with the mixed adhesive 108 interposed therebetween. Pressing the edge portions 61, 67 against each other allows the mixed adhesive 108 to be evenly spread over the entire length of the edge portions 61, 67.

It thus becomes possible for the hull 60 and the deck 66 to advantageously or efficiently adhere to each other.

Figure 10A:
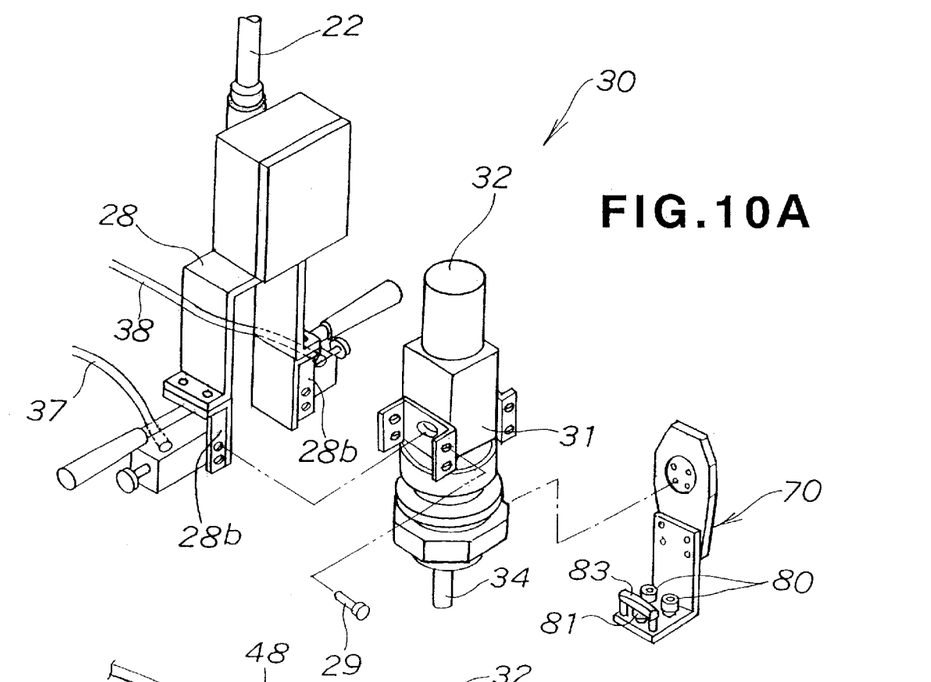
FIG. 10A and FIG. 10B are views illustrating how the gun is dismantled when cleaned.
Figure 10B:
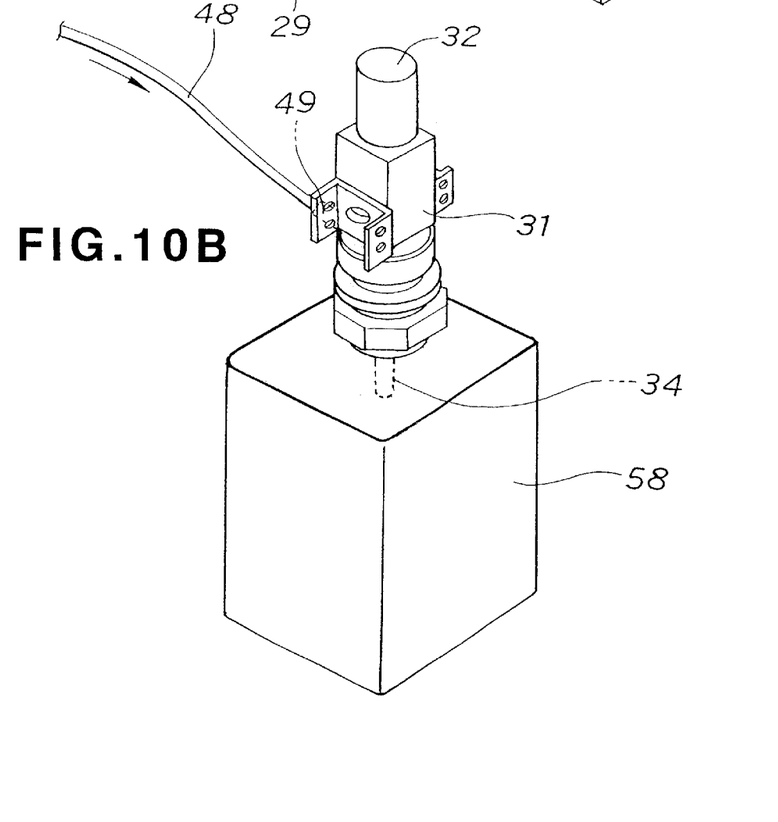

The gun 30 can be cleaned in a manner as described in relation to FIG. 10A and FIG. 10B.

As shown in FIG. 10A, the guide means 70 is detached from the body 31. The pins 29 are removed from the lower ends 28b, 28b of the hold member 28 to detach the body 31 from the hold member 28.

As shown in FIG. 10B, the nozzle 34 is inserted into an opening 58a (see FIG. 1) formed in the tank 58 of the gun 30. A hose 48 is connected to a valve 49 of the body 31. Water is then supplied to the body 31 via the hose 48 to clean the body 31.

As the body 31 thus separated from the hold member 28 is cleaned, another new one can be mounted to the hold member 28 for continuous application of the adhesive. Consequently, the applying operation can be performed efficiently using the body 31 separable from the hold member 28.

The mixed adhesive 108 containing the two agents, i.e., the adhesive and the hardener is used in the illustrated embodiment. The number of agents contained in the adhesive is not limited to two. Use of an adhesive alone is also permissible, for example.

For the purpose of illustration, and not for limitation, the mixed adhesive 108 is applied to the upper edge portion 61. It should be noted that the mixed adhesive 108 is applicable to any portion similar in configuration to the upper edge portion 61.

The body 65 is thrust by a jet pump or other similar means carried thereon.

The present disclosure relates to the subject matter of Japanese Patent Application No. 2001-364503, filed Nov. 29, 2001, the disclosure of which is expressly incorporated herein by reference in its entirety.

What is claimed is:

1. A manual adhesive applying apparatus for use in applying an adhesive to an upper edge portion of a hull having a side flange extending vertically downward, said adhesive applying apparatus comprising:
   a hand-operated adhesive applying gun having a nozzle for ejecting the adhesive therefrom;
   a support mechanism for supporting the adhesive applying gun such that the adhesive applying gun can be moved in both horizontal and vertical directions relative to the hull with the nozzle disposed generally vertically; and,
   a guide device mounted to said adhesive applying gun for movement in unison with the adhesive applying gun and slidably engaging with the side flange of the upper edge portion of the hull to guide said adhesive applying gun to move along the upper edge portion with the nozzle disposed above the edge portion of the hull.

2. The manual adhesive applying apparatus as claimed in claim 1, wherein said guide device comprises plural idler rollers disposed on opposite sides of the side flange to hold the side flange therebetween.

3. The manual adhesive applying apparatus according to claim 2, wherein said plural idler rollers comprises tow outer idler rollers disposed outside the side flange and juxtaposed in parallel to the upper edge portion of the hull, and a single inner idler roller disposed inside the side flange and arranged in a staggered relation to the two outer idler rollers.

4. The manual adhesive applying apparatus according to claim 1, wherein said guide device comprises a height positioning member disposed inside the side flange and slidably engaged with an undersurface of the upper edge portion of the hull to keep a distance between the nozzle of the adhesive applying gun and an upper surface of the upper edge portion of the hull at a generally constant value.

5. The manual adhesive applying apparatus according to claim 1, wherein said adhesive applying gun and said guide device are rotatable relative to each other about an axis of the nozzle.

6. An adhesive applying apparatus for use in joining a hull and a deck together with an adhesive, the hull having a hull body and an upper edge portion formed integrally with the hull body, the upper edge portion having a horizontal portion extending outwardly from an upper end of the hull body and a side flange extending downwardly from an outer end of the horizontal portion, said adhesive applying apparatus comprising:

an adhesive applying gun for ejecting the adhesive; and, a guide device mounted to said adhesive applying gun for guiding said adhesive applying gun such that said adhesive applying gun moves along the upper edge portion to apply said adhesive to the upper edge portion;

wherein said guide device comprises plural rollers disposed on opposite sides of the side flange to sandwich the side flange; and, wherein said plural rollers comprise a pair of outer rollers disposed outside the side flange and juxtaposed in parallel to said upper edge portion, and an inner roller disposed inside said side flange.

7. An adhesive applying apparatus for use in joining a hull and a deck together with an adhesive, the hull having a hull body and an upper edge portion formed integrally with the hull body, the upper edge portion having a horizontal portion extending outwardly from an upper end of the hull body and a side flange extending downwardly from an outer end of the horizontal portion, said adhesive applying apparatus comprising:

an adhesive applying gun for ejecting the adhesive; and, a guide device mounted to said adhesive applying gun for guiding said adhesive applying gun such that said adhesive applying gun moves along the upper edge portion to apply said adhesive to the upper edge portion;

wherein said guide device comprises plural rollers disposed on opposite sides of the side flange to sandwich the side flange; and, wherein said guide device further comprises a height positioning member disposed to abut on a back surface of the horizontal portion to keep a distance between the upper edge portion and said adhesive applying gun at a generally constant value.

* * * * *

UNITED STATES PATENT AND TRADEMARK OFFICE
CERTIFICATE OF CORRECTION

PATENT NO. : 6,660,087 B2
DATED : December 9, 2003
INVENTOR(S) : Murakami et al.

It is certified that error appears in the above-identified patent and that said Letters Patent is hereby corrected as shown below:

Column 9,
Line 3, after "the" (first occurrence), insert -- upper --.

Signed and Sealed this

Third Day of February, 2004

JON W. DUDAS
*Acting Director of the United States Patent and Trademark Office*